United States Patent [19]

Berger et al.

[11] 4,214,670

[45] Jul. 29, 1980

[54] METHOD FOR ROTATIONALLY MOLDING A HOLLOW ARTICLE AND ARTICLE MADE THEREBY

[75] Inventors: Sidney Berger, Great Neck; John J. Cubieta, Bayshore, both of N.Y.

[73] Assignee: United Utensils Company, Inc., Port Jefferson, N.Y.

[21] Appl. No.: 971,366

[22] Filed: Dec. 20, 1978

[51] Int. Cl.$^2$ ............................ B65D 1/00; B29C 5/04
[52] U.S. Cl. .................................... 220/70; 220/1 B; 248/146; 264/261; 264/275; 264/277; 264/279; 264/310
[58] Field of Search ............... 264/310, 311, 271, 275, 264/277, 278, 261, 279; 220/1 B, 68, 70; 425/429, 434, 435; 206/511, 425, 449, 508, 560; 108/161, 901; 248/146, 148, 188.1, 188.8

[56] References Cited

U.S. PATENT DOCUMENTS

| | | | |
|---|---|---|---|
| 2,629,134 | 2/1953 | Molitor | 264/310 |
| 2,839,788 | 6/1958 | Dembiak | 264/310 |
| 3,364,292 | 1/1968 | Lemelson | 264/275 |
| 3,903,641 | 9/1975 | Hoffman et al. | 220/69 |
| 4,101,619 | 7/1978 | Conway et al. | 264/310 |
| 4,143,193 | 3/1979 | Rees | 264/310 |

FOREIGN PATENT DOCUMENTS 805,243 12/1958 United Kingdom ................. 220/69

Primary Examiner—W. E. Hoag
Attorney, Agent, or Firm—St. Onge, Steward, Johnston, Reens & Noe

[57] ABSTRACT

A technique for the rotational molding of hollow articles having separate but structurally integral compartments is described. A mold in which the article is to be formed is provided with a cover between the mold cavities in which the article compartments are to be rotationally molded. The cover is selectively spaced from the mold wall so that a thermoplastic resin used to form the article can pass through the space between the cover and the mold wall to form the article walls for the compartments. The cover spacing from the mold wall is so selected that the build-up of the article's wall eventually seals off this spacing and enables further rotational molding of an article wall over the cover to isolate the compartments. In the specific embodiment, a technique for the rotational molding of a tank with legs below a bottom wall and a continuous uninterrupted interior bottom surface is described.

9 Claims, 11 Drawing Figures

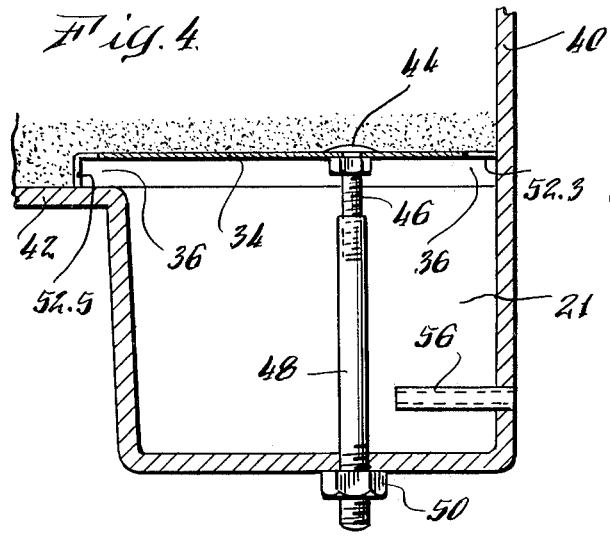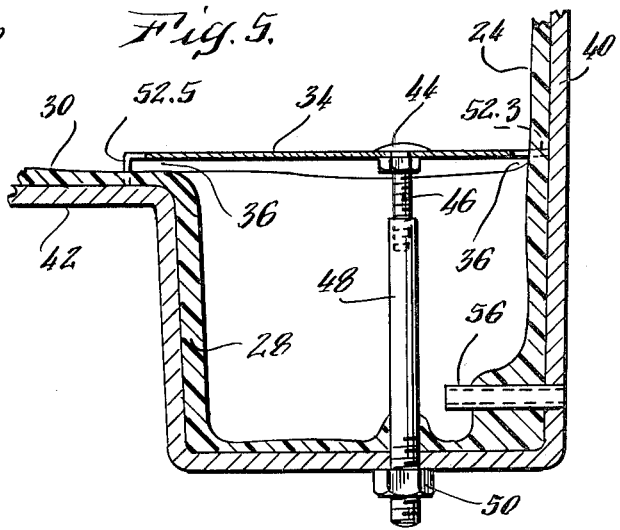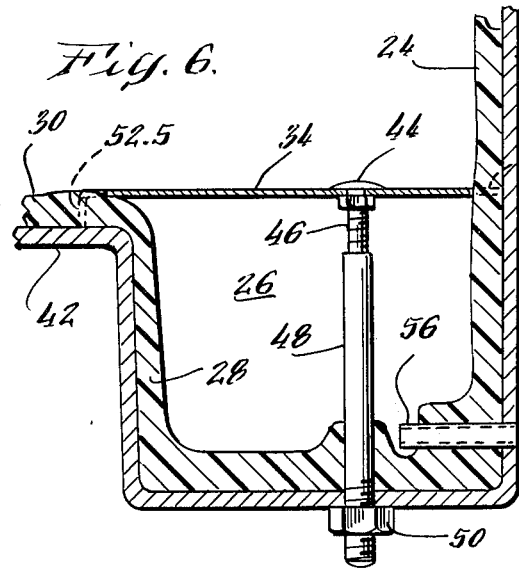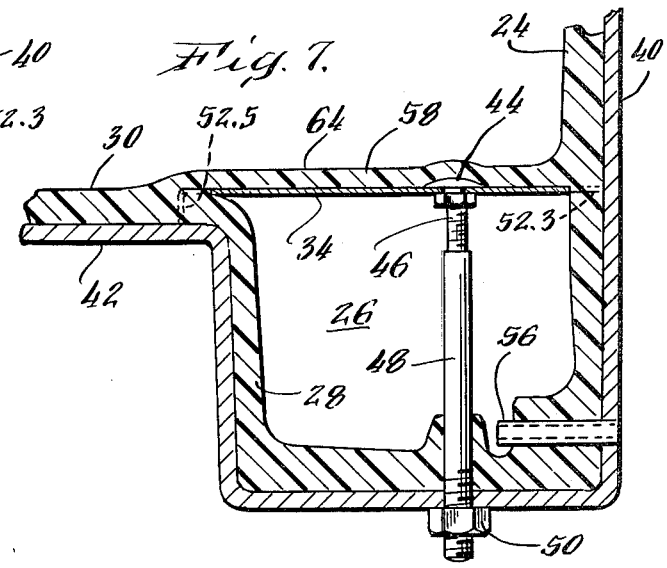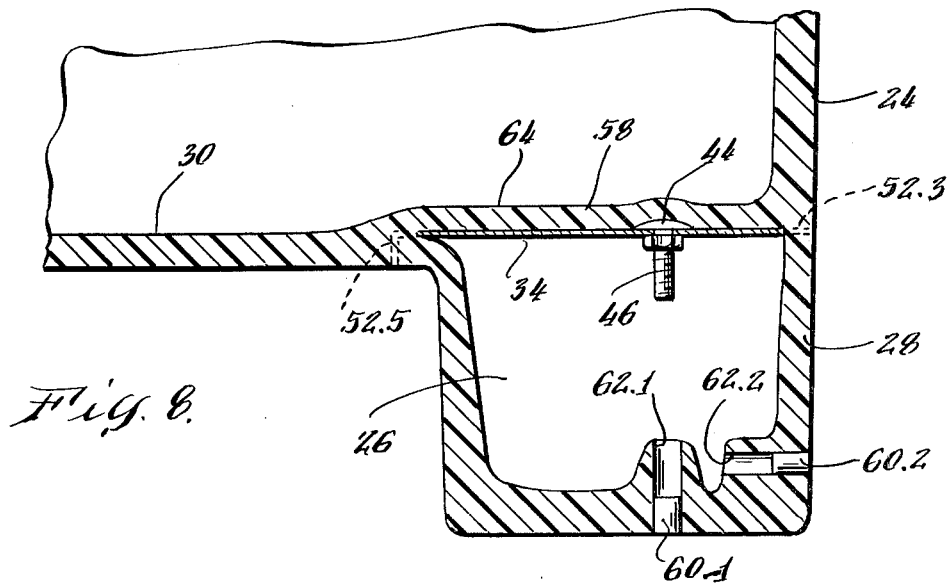

METHOD FOR ROTATIONALLY MOLDING A HOLLOW ARTICLE AND ARTICLE MADE THEREBY

FIELD OF THE INVENTION

This invention relates to a rotational molding of hollow articles. More specifically, this invention relates to an improved rotational molding technique for forming tanks or vats with legs.

BACKGROUND OF THE INVENTION

The production of hollow articles by a process known as "rotational molding" is well known in the art. See, for example, U.S. Pat. No. 2,881,476 to Page, U.S. Pat. No. 3,134,140 to Knowles, U.S. Pat. No. 3,703,348 to Pivar and U.S. Pat. No. 3,822,980 to Graeper. In rotational molding a charge of resin such as a powder of thermoplastic material is placed in the cavity of a mold. The mold is heated and rotated, either partially or fully, to tumble the charge of resin, which fuses to the mold wall with gradually increasing thickness to form the article. In the molding apparatuses of Page, Knowles and Pivar, the mold is directly heated by flames of gas, whereas the mold in the apparatus described in the Graeper patent is heated and rotated in an oven.

The rotational molding of large tanks can be achieved. Such large tanks may be used for many different purposes, but a particular advantage of a plastic tank is its utility in the food processing industry. Large plastic tanks, however, are by themselves difficult to move about when containing a liquid. Fork lift equipment may be used to pick up a tank placed on a skid into which the pick-up fork of the lift can be inserted. Such skid, however, when formed of wood may not be acceptable in a food processing plant and accordingly, plastic tanks are often provided with suitable legs to raise the tank bottom to a level where a fork lift can be used to move the tank.

The use of tank legs, for example, at four bottom corners of a rectangular tank, has the advantage that a fork lift can be inserted below the tank bottom between any two legs and thus form any side. The tank legs being made simultaneously with the rotational molding of the tank, are as a result hollow, thus forming corner located recesses inside the tank.

These recesses may at times present an irregular internal surface with ridges as a result of an irregular buildup of the tank wall at the legs. Such irregularity tends to arise particularly when, during the rotational molding, preferential orientations are employed to increase the thickness of the tank wall at the legs for improved strength. These irregularities on the surface of the wall of the recesses tend to collect and retain food materials, thus leading to bacteria formation unless great care is exercised to clean the recesses. Techniques are available to smooth the wall surface, but aside from the burden such wall smoothing operation would add to the rotational molding of a tank with legs, one still is left with a recess, which if not properly cleaned, presents a potential source of poor hygiene.

Rotationally molded plastic tanks for use in food processing plants, therefore, are commonly required to have a smooth walled interior without small recesses. When hollow tank legs are added, techniques have been employed to close the recesses in the legs. One approach involves forming the legs of solid plastic during the molding process. This, however, requires an undesirably large amount of plastic. Such heavy wall thickness for the tank legs is also difficult to obtain since, as the wall thickness increases, the wall itself becomes an insulator and, at least in the technique of heating the mold from an external heat source, eventually inhibits sufficient fusing of thermoplastic material to form a solid leg.

Another technique involves welding legs onto the tank after the tank with a smooth bottom has been molded. A plastic weld zone, however, often does not have the desired strength and welded-on legs tend to break off during tank manipulation. One may, for example, imbed a metal fitting in the tank bottom to add strength in the subsequent attachment of a leg. Such fitting can be added by utilizing a flange which is spaced above an opening in the mold by a suitable spacer. The spacer fits over and closes the mold opening and a bolt, connected to the spacer, protrudes externally through the mold opening. During rotational molding, plastic fuses into the space between the flange and the mold wall as well as over the flange to thus imbed the latter in the tank bottom. This technique can be used to improve attachment of tank legs, but the strength of the attachment depends on the plastic portion which imbeds the flange. This technique usually results in inadequate strength of attachment of the tank legs and since it involves special high strength fittings, tends to be uneconomical.

SUMMARY OF THE INVENTION

In one technique for the rotational molding of a tank in accordance with the invention, the tank legs are rotationally molded at the same time the tank is formed. The rotational molding technique, however, results in a tank bottom without recesses at the tank legs but with a smooth bottom wall which is easy to clean and thus renders the tank highly suitable for use in food processing plants.

This technique is achieved by placing a cover over each of the mold cavities where the tank legs are to be formed. The cover is carefully spaced from the tank wall so that, as the charge of resin is tumbled during rotational molding, resin may pass through the space between the cover and the mold wall into the mold cavity where the tank legs are to be formed.

As the wall thickness builds up, both at the mold leg cavities and other mold areas during the rotational molding, the space between the cover and the mold wall eventually is closed, thus automatically sealing off the interior of the molded legs from the main cavity of the mold.

The rotational molding is continued so that further wall thickness is deposited on the cover to merge with adjoining tank wall segments. The cover eventually is fully enclosed, by the tank wall, which presents a smooth interior, yet with integrally molded-on legs. The tank wall formed on the cover overlying the legs may be of somewhat smaller thickness than elsewhere. However, the cover below this part of the tank wall advantageously provides reinforcement.

A rotational molding technique in accordance with the invention may be used to make other articles than tanks. In fact, whenever a rotationally molded article is to be formed with compartments which are structurally integrally connected, yet separated from each other, the rotational molding technique in accordance with the invention can be advantageously used. The walls of each compartment can be merged with each other in a contiguous manner to provide a high strength article structure. At the same time, a separating wall between the compartments is formed and becomes an integral part of the molded article.

It is, therefore, an object of the invention to provide a rotationally molded article and a method for the rotational molding of the article with structurally integral separate isolated compartments. It is a further object of the invention to provide a tank and a rotational molding technique for the making of the tank with a smooth bottom to which legs can be molded during the formation of the tank.

These and other objects and advantages of the invention can be understood from the following description of one embodiment for making an article in accordance with the invention as described hereinafter in conjunction with the drawings.

BRIEF DESCRIPTION OF DRAWINGS

FIGS. 4-8 are each a partial section view of the mold of FIG. 1 illustrating sequential stages in the formation of a tank with rotationally molded legs in accordance with the invention;

DETAILED DESCRIPTION OF EMBODIMENTS

Figure 1:
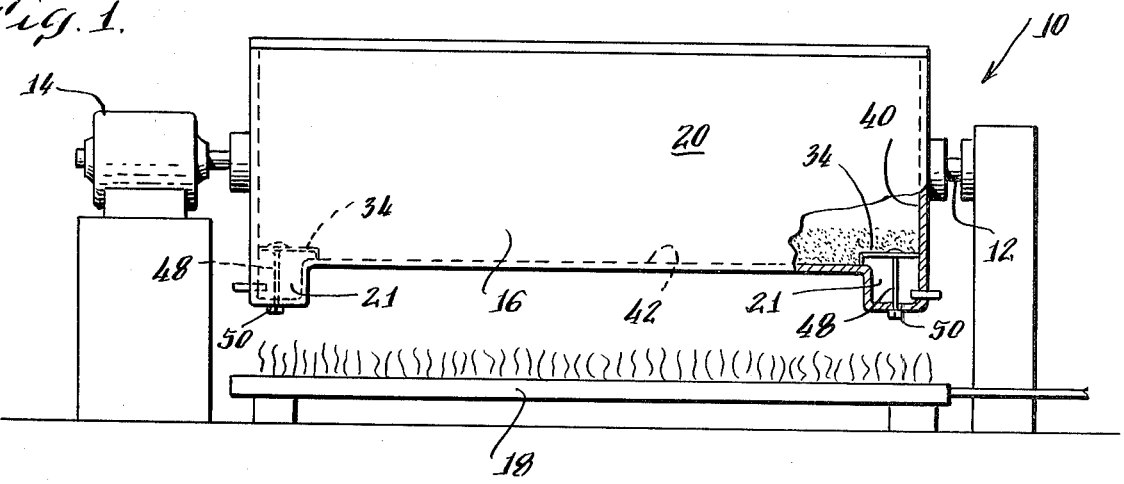
FIG. 1 is a side view in elevation of a conventional rotational molding apparatus with a mold modified in accordance with the invention.
Figure 2:
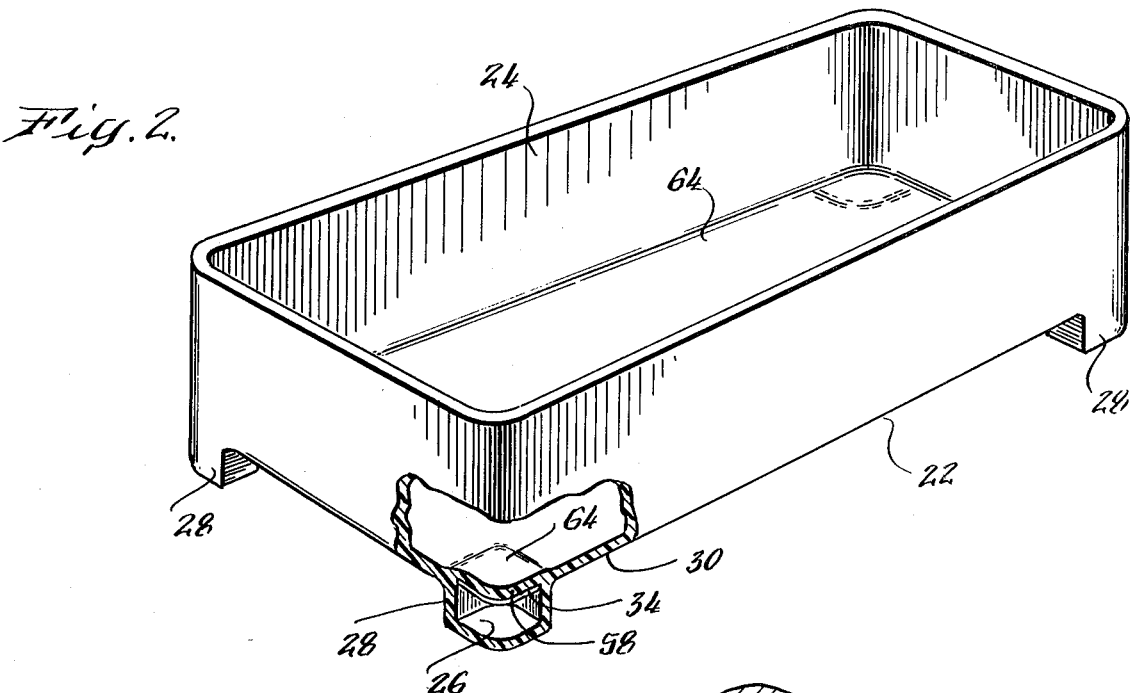
FIG. 2 is a perspective view of a rotationally molded tank formed in accordance with the invention.
Figure 3:
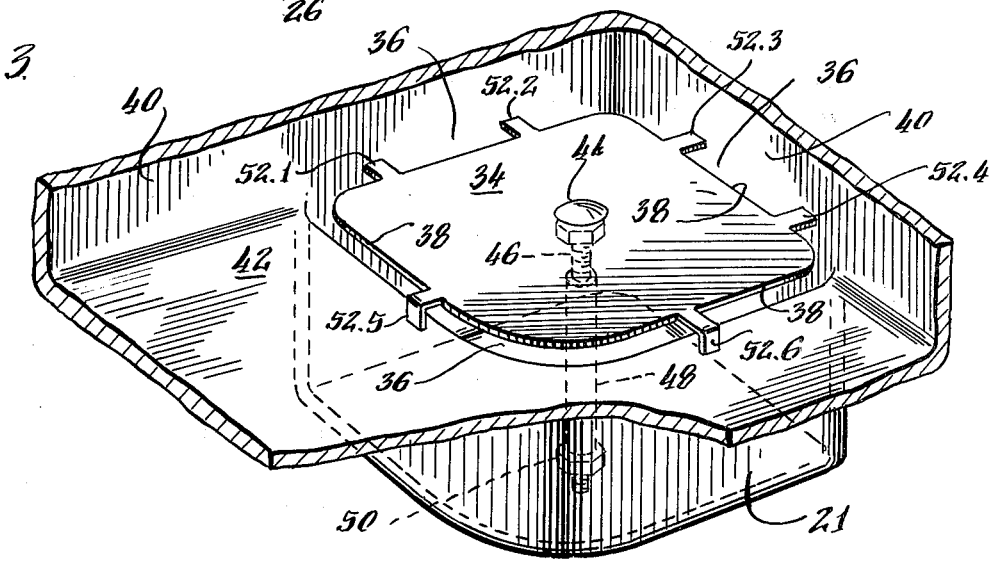
FIG. 3 is a perspective enlarged view of a cover installation as employed with the mold as shown in FIG. 1.

With reference to FIGS. 1-3, a rotational molding apparatus 10 is shown as of the type described in the aforementioned patents to Page or Pivar. The apparatus 10 includes a suitable rotational support 12 and rotational drive 14 so as to rotate a mold 16 in various orientations such as horizontal as shown and inclined as may be desired. A source 18 of heat is provided from a gas flame to heat the mold 16 to the proper temperature. Devices for rotating, inclining and otherwise manipulating mold 16 are well known and need not be described in further detail. Complete rotation of the mold may not be necessary, and the term rotating, or rotational molding as used herein includes all such movements, whether involving full or partial rotations, of a mold as will result in the formation of a molded article. Suffice it to note that the mold 16 may, when desired, be rotated with a preferred orientation such as, for example, to build up a greater wall thickness in a particular region of mold 16.

The apparatus 10 is suitable for molding a great variety of hollow articles. This is done by placing a charge of resin of a plastisol or thermosetting plastic material inside cavity 20 of mold 16 and thereafter rotating the mold to gradually build up an article wall inside cavity 20 and in leg-forming cavity 21. The shape of the mold cavity 20 determines the article which may, for example, require the formation of separate compartments, whose walls are an integral part of the entire molded structure but wherein the compartments are separated from each other. One such article, for example, is tank 22 whose main compartment is a cavity 24 which is separated from recesses 26 in corner located legs 28. Legs 28 serve to space the tank bottom wall 30 above the ground.

The tank legs 28 are formed at the same time when tank 22 is rotationally molded in mold 16. The hollow recesses 26 in each leg 28, however, are separated from the main cavity 24 of tank 22 by the tank's bottom wall 30. The tank 22, therefore, has a bottom wall 30 with a smooth surface uninterrupted by recesses 26 of legs 28, yet with high-strength integrally rotationally molded legs 28.

The formation of isolated yet structurally integral rotationally molded compartments is obtained by attaching to mold 16, covers 34 over each cavity 21 in which a separate compartment, i.e. a leg 28, is to be formed. The covers 34 are so positioned that they form a space 36 between the edge 38 of covers 34 and the vertical mold wall 40 and bottom mold wall 42.

Various techniques may be employed to attach covers such as 34 to a mold 16. In the embodiment of FIGS. 1 and 3, the covers 34 are each provided with a permanently attached round headed bolt 44 whose threaded end 46 extends into the leg-forming cavity 21. A suitable internally threaded tube 48 is threaded onto bolt 44 and in turn extends through a snug fitting opening in mold 16 for attachment to a fastener 50 external to mold 16.

The spacing 36 between cover 34 and mold 22 is controlled so that powder resin, during rotational molding, can pass through space 36 from the main cavity 20 to the leg forming cavity 21 of mold 16 to form a leg 28. In addition, the space 36 has such width, that the build-up of the article wall by the resin will eventually close the space 36 and enable the formation of the bottom wall over cover 34. Hence, spacing 36 is further so selected that it is less than the final desired article wall thickness in the vicinity of cover 34, but sufficiently large to enable the build-up of a satisfactory mold wall in leg cavity 21.

With a cover 34, the desired space 36 is obtained by providing cover 34 with spacers such as 52. The spacers 52.1–52.4 extend laterally to contact mold wall 40 whereas spacers 52.5 and 52.6 are bent to seat on bottom mold wall 42. In one example the spacers 52 may have a length of about ¼ inch while the article wall may have a desired thickness of the order of about ⅜ of an inch.

Once the covers 34 are positioned in mold 16, a charge of powder resin 54 is placed in the mold cavity 20, see FIGS. 4–8. The mold is heated and appropriately rotated to tumble the charge of resin 54. Suitable vents such as tubes 56 are provided into the various mold cavities to avoid collapse of the mold in the leg cavities 21 and main mold cavity 20.

The resin as it passes through space 36 commences the build-up of a wall as shown in FIG. 5 inside leg cavity 21. When the article wall thickness equals that of spacing 36, as shown in FIG. 6, further resin addition to cavity 21 is prevented. Continued mold rotation, however, enables the wall building process to continue as illustrated in FIG. 7 so that the bottom wall 30 has a segment 58 formed over cover 34 and joined in a contiguous manner with the other walls of the rotationally molded structure. When the rotational molding process is completed, the vents 56 and cover retaining tube 48 are withdrawn. Plugs 60 are then inserted in the remaining openings 62 and welded into place to seal off the leg recesses 26.

The bottom wall segment 58 of the molded article has, as illustrated in FIG. 8, a smooth interior surface 64 over the leg 28 free from crevasses and cracks. The molded tank 22 being thus easily cleaned can be safely and advantageously used in a food processing plant.

As can be seen from FIGS. 7 and 8, the wall thickness of legs 28 are made substantially thicker than other regions of the tank wall. This reinforces the tank where large load stresses are likely to occur. Such increased deposition of resin may be achieved by preferential orientation so that an adequate amount of resin is passed through spacing 36 into leg cavity 21 of mold 16. Once resin has entered a leg cavity 21, the resin tends to be blocked from easy escape by cover 34, thus assuring sufficient wall build-up in the leg cavity 21. With appropriate orientation, an article wall may be formed on both sides of the cover 34.

The fusion of resin to form an article on the mold wall requires a sufficient amount of heat transfer through the mold and the adjoining plastic wall. The internal location of cover 34 should be sufficiently heated to obtain the overlying layer 58. The cover 34, therefore, is preferably formed of metal with a heat conductivity sufficient to obtain a generally uniform wall layer 58. Hence, bolt 44 and retaining tube 48 also serve to provide a heat conductive path from the externally heated mold 16 to cover 34. Additional heat conductive paths are provided by spacers 52 where they contact a mold wall. A cover 34 formed of steel or aluminum may be used with an aluminum cover 34 of a thickness of about 1/16 of an inch being satisfactory for use in forming a leg 28.

The formation of a rotationally molded article requires that the charge of resin has a sufficient dwell time over any mold portion to fuse and thus build up the article wall. The required dwell time is a function of the mold wall temperature with a higher temperature requiring less dwell time and vice versa. Hence, preferential orientation may be needed to assure adequate dwell time of the resin over cover 34. Such preferential orientation can be more easily achieved for mold regions near a side wall or corner such as illustrated in FIGS. 1-8. However, when a separated cover layer such as 58' is to be formed in the center of a mold wall as shown in FIG. 9, the location of the resin charge and thus its dwell time over such central compartment 76 is more difficult to increase or control.

Figure 9:
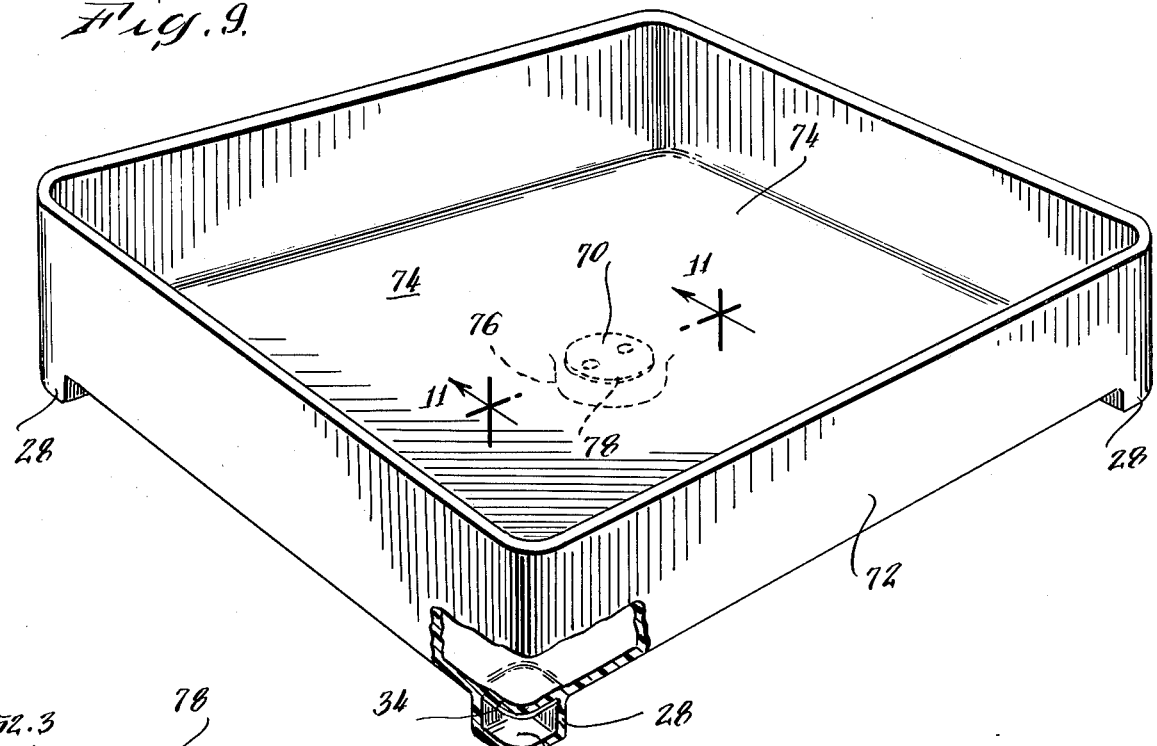
FIG. 9 is a perspective view of a vat having legs formed in accordance with the invention.
Figure 10:
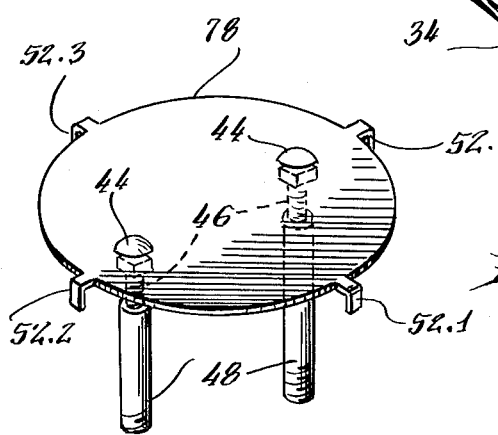
FIG. 10 is a perspective view of a cover employed in the formation of one of the legs of the vat shown in FIG. 9.
Figure 11:
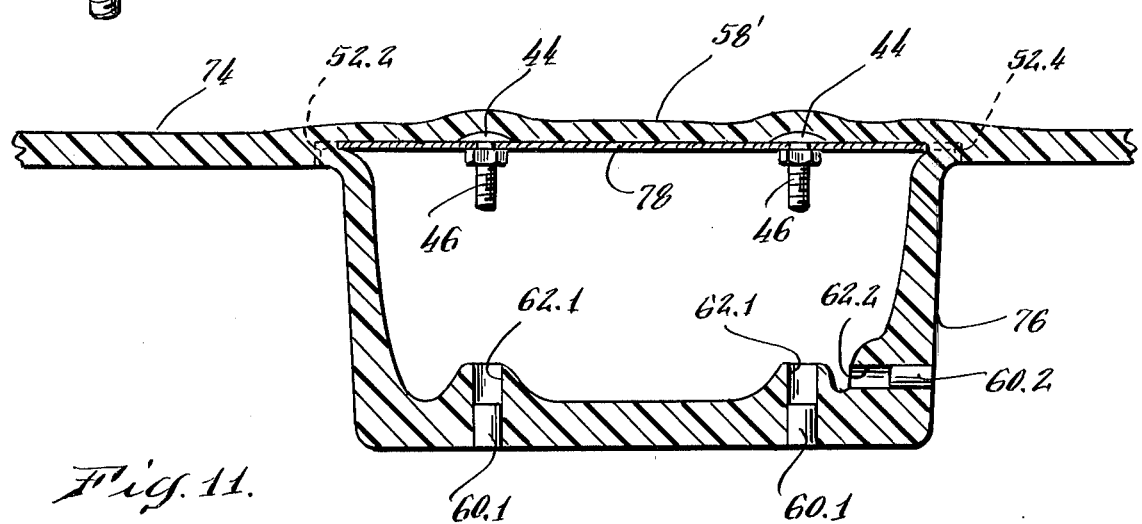
FIG. 11 is an enlarged section view of the vat of FIG. 9 taken along a line 11—11 therein.

In FIG. 9, for example, a large rotationally molded tank in the shape of a vat 72 is shown whose bottom wall 74 is so large that an additional central leg 76 is required to support the vat load. In such case, a similar procedure as described with reference to FIGS. 1-8 can be employed to form a leg 76 below a round cover 78. In this case, however, the cover preferably is formed of a very high heat conductive metal, such as copper and several heat conductive cover retainers 44, 48 can be used to maintain the cover 78 at a sufficiently high temperature. In such case the resin dwell time over cover 78 as the mold is rotated is adequate to build up a covering layer 58'. Note that covers such as 34 and 78 preferably are formed of a solid metal plate. However, in some cases a screen material can be used with the screen apertures being such that the rotational molding results in the build-up of sufficient material to close the screen apertures to separate the article compartments.

Having thus described a method for rotationally molding of a tank with legs and a smooth uninterrupted bottom wall, the advantages of the invention can be appreciated. Other types of articles which have separate isolated compartments can be formed by one employing the teachings of this invention. Hence, the scope of the invention is to be determined by the following claims.

What is claimed is:

1. A rotationally molded hollow rigid plastic tank having a main compartment bounded by a bottom wall and a side wall and a plurality of hollow legs extending below the tank bottom and being an integral part of the tank;

said hollow legs each having a generally flat metallic cover overlying the hollow of a leg and extending into said tank side wall;

said tank bottom wall having separator segments respectively extending over said covers to merge with said side wall in a contiguous manner to form a smooth uninterrupted bottom surface for said main compartment;

with each of said hollow legs having a leg wall which is integrally joined by rotational molding of the tank to the tank side and bottom walls with the hollow of said legs being isolated from the main compartment of said tank by the separator segments.

2. A unitary rotationally molded tank structure with integrally and rotationally molded internally covered hollow legs and being integral with said tank with the hollow of said legs being isolated from the tank structure.

3. The unitary rotationally molded tank structure as set forth in claim 2 wherein said tank structure has a bottom wall overlying the hollow legs and wherein said hollow legs each include a metal cover overlying the hollow of a leg and is imbedded in the bottom wall of the tank structure.

4. In the rotational molding of a structurally large tank having a tank compartment bounded by a bottom wall and a plurality of legs extending below the tank bottom by tumbling a charge of resin within a rotated heated mold having its mold wall shaped to form a main cavity and leg cavities in which cavities said tank is to be formed, the improvement comprising the steps of placing a generally flat continuous metallic cover inside the mold between each of the leg cavities and the main cavity with a predetermined spacing between the cover and the mold wall, said spacing being selected to enable resin to pass therethrough from the main cavity to the leg cavities to form leg walls therein;

rotating said mold with heat and with a charge of resin to enable said resin to pass throughout the main cavity and through said spacing between the cover and the mold wall into said leg cavities and fuse resin adjacent the mold wall to build up a rigid structural tank wall forming a main tank compartment, the leg wall in said leg cavity being built up by said rotating step until said leg wall has accumulated a thickness so as to prevent entry of resin into said leg cavity through said spacing between the cover and the mold wall, said rotating step being continued to build up a tank bottom wall over said tank wall to form said tank with hollow legs whose hollow is isolated from the main tank compartment while said leg walls are structurally integrally rotationally molded with the tank wall.

5. A method for rotationally molding of a tank having a tank bottom with legs by tumbling a charge of resin within a rotated heated mold which has its mold wall shaped to form a tank cavity and leg cavities in which said tank is to be formed, comprising the steps of
placing covers inside the mold over each of the leg cavities with a predetermined spacing between each cover and the mold wall, said spacing being selected to enable resin to pass therethrough from the tank cavity to the leg cavities to form a wall inside therein;
rotating said mold with heat and with a charge of resin to pass said resin throughout the tank cavity through said spacing into the leg cavities and fuse resin adjacent the mold wall to build up a tank wall and leg walls until said leg walls have been built to a thickness so as to prevent entry of resin into said leg cavities through said spacing, said rotating step being continued to build up a tank bottom wall over said covers and contiguous with the tank wall whereby said tank is rotationally molded with separate and isolated legs which are structurally integrally joined to the tank wall.

6. A rotationally molded tank with internally covered hollow legs formed in accordance with the method of claim 5.

7. The rotational molding method for forming a tank as set forth in claim 5 wherein said cover placing step further includes the step of
supporting said covers from the mold with heat conducting elements.

8. The rotational molding method for forming a tank as set forth in claim 7 wherein said covers are formed of metal.

9. The rotational molding method for forming a tank as set forth in claim 8 wherein said covers are provided with spacer elements sized to establish said desired spacing and enable heat conduction between the covers and the mold.

* * * * *